(12) United States Patent
Shanks, Sr.

(10) Patent No.: US 6,256,974 B1
(45) Date of Patent: Jul. 10, 2001

(54) LINK STRUCTURE FOR A CHAIN

(76) Inventor: Douglas G. Shanks, Sr., 7726 Bonniebrook, Sylvania, OH (US) 43560

( * ) Notice: Subject to any disclaimer, the term of this patent is extended or adjusted under 35 U.S.C. 154(b) by 0 days.

(21) Appl. No.: 09/566,156

(22) Filed: May 5, 2000

(51) Int. Cl.[7] .................................................. F16G 13/06
(52) U.S. Cl. .................................................. 59/85; 59/78
(58) Field of Search .................................. 59/80, 85, 84, 59/78

(56) References Cited

U.S. PATENT DOCUMENTS

| | | | | |
|---|---|---|---|---|
| 407,584 | * | 7/1889 | Foster | 59/85 |
| 839,047 | * | 12/1906 | Sylvester | 59/85 |
| 1,161,004 | * | 11/1915 | Merritt | 59/84 |
| 3,427,823 | * | 2/1969 | Musillo | 59/85 |
| 3,552,119 | * | 1/1971 | Newman et al. | 59/85 |
| 3,877,250 | * | 4/1975 | Musillo | 59/85 |
| 4,360,969 | * | 11/1982 | Collier | 59/85 |

* cited by examiner

*Primary Examiner*—David Jones
(74) *Attorney, Agent, or Firm*—John C. Purdue; David C. Purdue

(57) ABSTRACT

A chain link is disclosed. The link is composed of two abutting link parts, one of which has an end which is slidably received within a correspondingly shaped end of the other link part, and a connector, preferably a retaining snap ring. The ring is received in cooperating grooves in, and locks, the two link parts in their abutting positions. The grooves, the ring, and the link parts are so shaped and positioned that, when the ring is received within the grooves, the link parts constitute a complete link of a desired configurations, and are securely locked to one another by the ring. The link parts may initially be separate and have second ends corresponding with the first ends. Alternatively, the free ends of the link parts may be connected to or integral with a link body which connects them. At least a portion of the link body is flexible or malleable.

5 Claims, 3 Drawing Sheets

LINK STRUCTURE FOR A CHAIN

BACKGROUND OF THE INVENTION

1. Field of the Invention

This invention relates to a link structure for a chain. In one specific embodiment of the invention, two identical, hollow U-shaped members having first and second parallel legs connected by a curved portion constitute the links; the U-shaped members are connected together to form a chain link which can be generally an oval in plan view. The first parallel leg of each one of the U-shaped members has a free end with a wall defining an opening for receiving an end portion of a free end of the second leg of the U-shaped member, The free end portion of each of second legs has a region of reduced outside diameter. The end portions of the first legs and the ends portions of the second legs are sized so that the latter have a sliding fit inside the former. When the two are assembled, they are locked against relative sliding movement by a ring which is received in cooperating slots provided on the end portions of the U-shaped members. The outer surfaces of the U-shaped members, when they are connected, cooperate to present a smooth outer chain link surface.

In a second embodiment, the link structure is produced from a link blank having first and second free ends which extend towards each other. The first free end has a wall defining an opening for receiving an end portion of the second free end of the link blank. The free end portion of the second free end has a region of reduced outside diameter. The wall of the first free end and the end portion of the second free end are sized so that the latter has a sliding fit inside the former. The link is produced by positioning a locking ring in a circumferential groove provided on the inside of the wall of the first end or in a circumferential groove provided on the free end portion of the second free end. The link blank is then manipulated, if necessary, to axially align the free ends, and the free end portion of the second free end is pressed into the first free end until the ends are locked against relative sliding movement by the ring which is then received in the circumferential groove provided on the inside of the wall of the first end and the circumferential groove provided on the free end portion of the second free end.

2. Description of Related Art

Metal chains are usually produced from individual links which are not closed, but have a transverse break somewhere along their longitudinal length. Such a link can be formed so that it is, when formed, mated with a second link, and the break in the link can then be closed by welding, This production method is entirely satisfactory for the production of chains whose appearance is comparatively unimportant, but gives rise to problems when a decorative chain is desired, for example where the exposed surface is plated with silver, brass, cadmium or the like, or carries another decorative finish. If welding is carried out before the plating or other finish is applied, it is difficult to achieve a satisfactory and continuous finish to the individual links of the chain because of contact points between individual links. On the other hand, if the finish is applied to the individual links before they are assembled, the welding step defaces the finish.

In some applications, heavy looking, large links are desired in chain which is not required to have great strength. When made of links which are solid, such chain becomes unreasonably and unnecessarily heavy.

A preliminary patentability study revealed the following references: U.S. Pat. No. 2,906,507, 1959, "Hodson"; U.S. Pat. No. 3,153,898, 1964, "Gerhardt"; U.S. Pat. No. 3,662,539, 1972, "Florjancie"; and U.S. Pat. No. 4,787,601, 1988, "Rybak".

Hodson discloses a chain produced from a plurality of links, each of which has a single transverse break, and a fence construction which includes a chain produced from a plurality of the links. To produce the chain, several of the links are assembled, and a clip is keyed to the exterior of each link to lock the free ends thereof against relative movement.

Gerhardt discloses a chain produced from a plurality of hollow links, each of which has it transverse break, or is composed of two parts, one of which has two ends that are slidably received in cooperating ends of the other. In both cases, glass or other fibers are impregnated with what the reference calls a "binding agent" which can be hardened by polymerization, placed inside the hollow links, and heated to harden the binding agent, Florjancie discloses a chain produced by injection molding a first link into a second link.

Rybak discloses a chain composed of a plurality of generally "S" shaped links wherein at least one of the terminal portions of each link is slipped into the terminal portion of an adjacent link. In one embodiment, each link has a locking member which blocks the movement of one of the links into and out of the terminal portion of an adjacent link; the locking member can be easily deformed to enable movement into the terminal portion, but resists deformation to enable movement out of the terminal portion.

The attention of the inventor has also been called to the following patents because they were cited against an application which was directed to a different invention: U.S. Pat. No. 765,873, 1905, "Goldman"; U.S. Pat. No. 1,047,568, 1912, "Riess; U.S. Pat. No. 1,233,538, 1917, "Alden"; U.S. Pat. No. 1,507,808, 1924, Benjamin; U.S. Pat. No. 1,550,683, 1925, "Erikson"; U.S. Pat. No. 1,860,186, 1,932, "Kestenman"; U.S. Pat. No. 3,453,823, 1969, "Mundt"; U.S. Pat. No. 3,733,811, 1973, "Florjancic"; and U.S. Pat. No. 4,267,421, 1981, "Heppe". Of the foregoing patents, Goldman discloses hollow chain links formed of two link halves where the parting line is either longitudinal or transverse of the link halves, and members inside the assembled links which frictionally engage the two halves, and hold them in assembled relationship; Alden discloses connecting two completed links of a chain with a binder link that is opened at one end "and made of annealed or non-resilient metal that permits . . . [it] to be closed together without springing open"; Erikson discloses a link for a chain which is composed of two half links with transversely extending ends and lugs and depressions through which screws connect the half links; Florjancic discloses the production of a seamless chain by molding a link from a reinforced polyester or the like molding composition around a previously formed link; and Heppe discloses apparatus for "the successive welding of C-shaped, prebent interlinked chain links forming a chain." The others of the cited references are deemed to be less relevant, but to relate to various chain structures. No art was found showing a chain link composed of two abutting link parts, one of which has an end which is slidably received within a correspondingly shaped end of the other link, and an interior ring locking the two link parts in their abutting positions.

BRIEF DESCRIPTION OF THE INSTANT INVENTION

Briefly the present invention is a chain link, In one embodiment, the link is composed of two abutting link parts, each having first and second free ends. The first ends of the link parts are slidably received within the cooperatively shaped second ends of the link parts, and retaining snap rings lock the two link parts together in their abutting positions. The abutting link parts are so configured that, together, they constitute a complete link of a desired configuration, The retaining snap rings which lock the link parts in their abutting positions are received in cooperating grooves in the correspondingly shaped ends of the links. The grooves, the rings, and the link parts are so shaped and positioned that, when the ring is received within the grooves, the link parts constitute a complete link of the desired configuration, and are securely locked to one another by the rings. The ends of the link parts that are slidable relative to one another are so configured that, before the two are assembled, the ring can be inserted in the grooves of two of the link member ends and the two link members can be manipulated together whereupon the retaining snap rings engage both grooves in cooperatively shaped ends and the link members are permanently connected, In a second embodiment, a link blank is provided which has two free ends cooperate as do the ends of the link members described above and are provided with grooves for engaging a retaining snap ring so that the blank can be manipulated, with the snap ring in one of the grooves, so that the free ends abut and the ring engages both grooves whereby the blank is permanently closed.

BRIEF DESCRIPTION OF THE DRAWING FIGURES

DETAILED DESCRIPTION OF THE INVENTION

Figure 1:
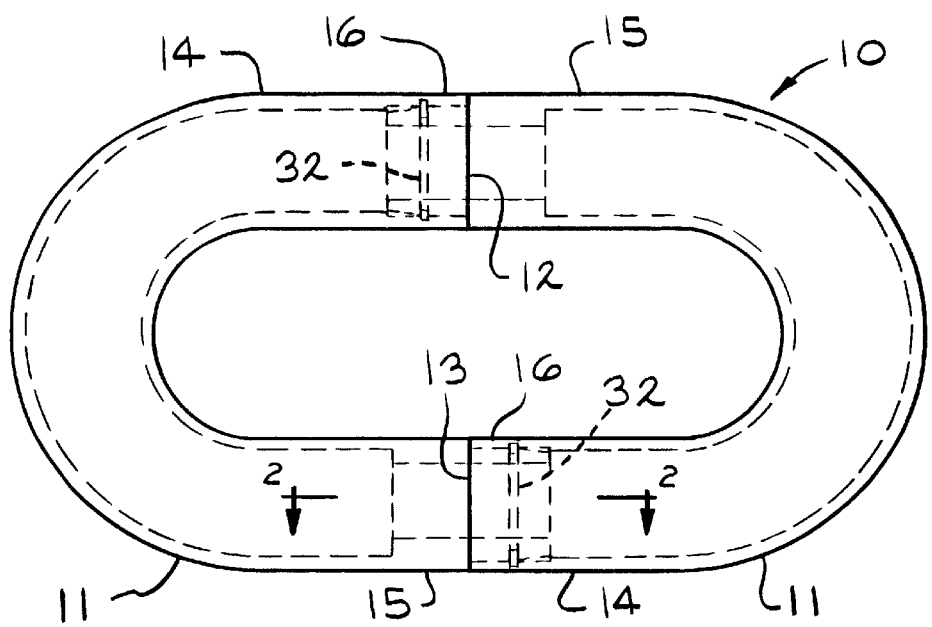
FIG. 1 is a plan view of an assembled chain link according, to the invention.

Referring in more detail to the drawings and, in particular to FIG. 1, an assembled chain link according to a first embodiment of the invention is indicated generally at 10. The link 10 is composed of two identical, hollow link components 11 which abut as indicated at 12 and 13 to form the link 10, The link components 11 have first legs 14 and second legs 15. In a given link component, the first leg 14 and the second leg 15 are substantially parallel to each other. As indicated by phantom lines, the link components 11 may be hollow.

Figure 2:
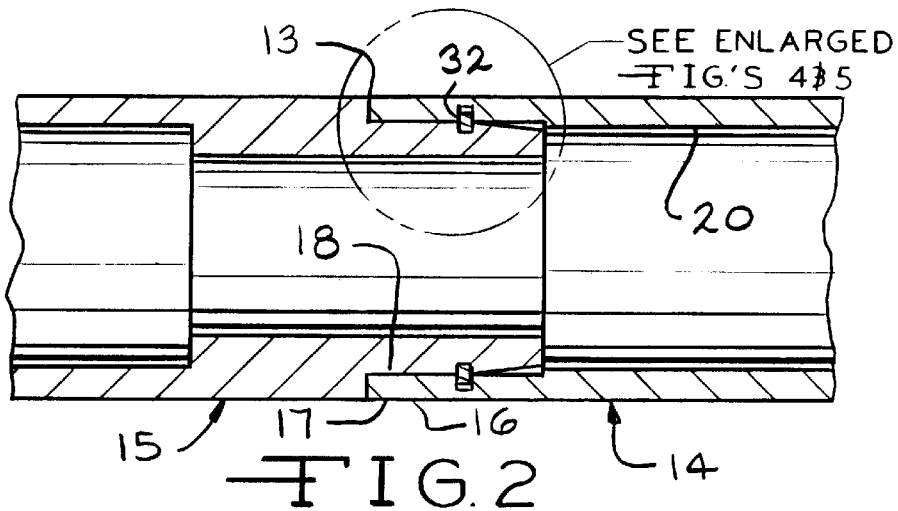
FIG. 2 is a sectional view along the line 2—2 of FIG. 1, showing portions of two link components according to the invention in their assembled relationships.
Figure 4:
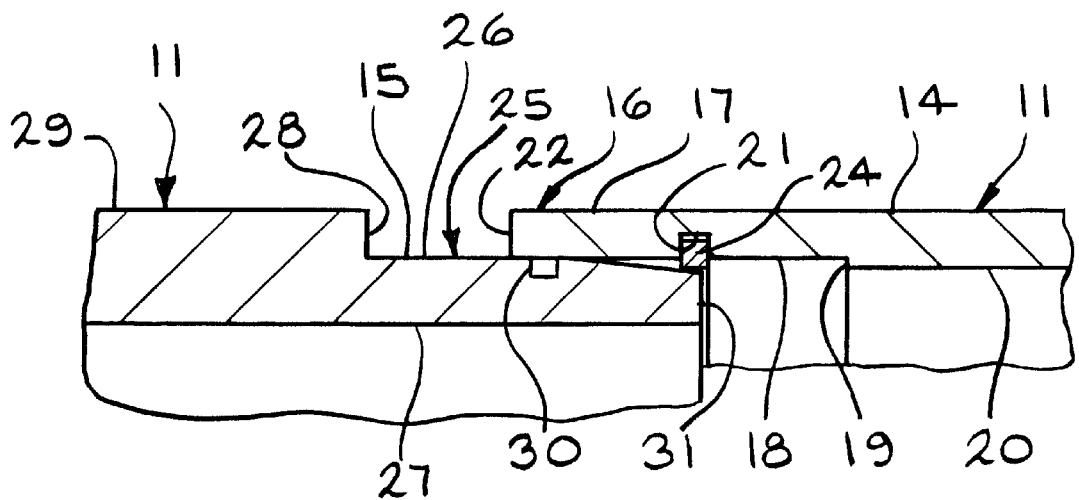
FIG. 4 is an enlarged view in section similar to FIG. 2, but showing the link components during assembly.
Figure 5:
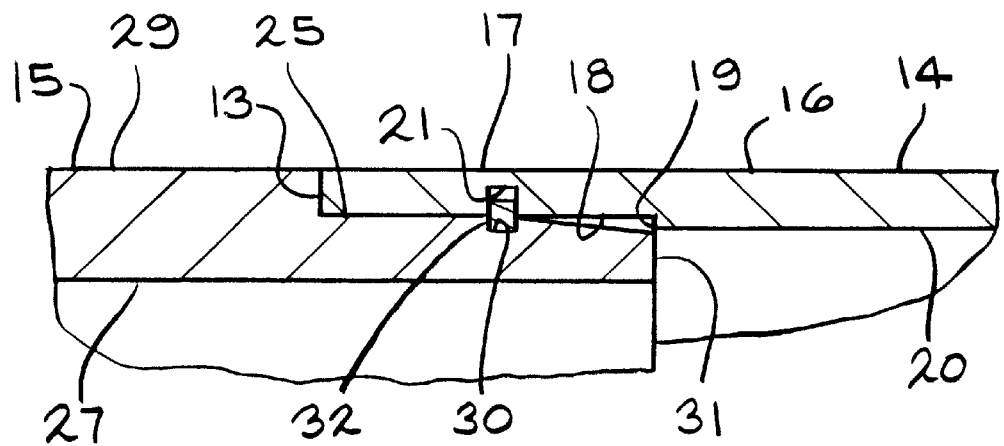
FIG. 5 is an enlarged sectional view similar to FIG. 2, and showing the link components after assembly.

The first legs 14 have free ends 16 with outer surfaces 17 and inner surfaces 18 (see FIGS. 2, 4 and 5). A shoulder 19 is provided between the inner surface 18 of the free end 16 of the first leg 14 and an inner surface 20 of the link component 11. A circumferential groove, indicated at 21, is formed in the inner surface 18 of the free end 16 of the first leg 14. At the end of the free end 16 of the first leg, there is a wall 22 (FIG. 4).

The second legs 15 have free ends 25 with outer surfaces 26 and inner surfaces 27. A shoulder 28 is provided between the outer surface 26 of the free end 25 and an outer surface 29 of the link component 11. A circumferential groove, indicated at 30, is formed in the outer surface 26 of the free end 25 of the second leg 15. Between the groove 30 and an end wall 31 of the free end 25 of the second leg 15, the free end is tapered so that it has a smaller outer diameter adjacent the end wall 31 than it has adjacent to the groove 30.

When a first leg 14 of a link component 11 is axially aligned with a second leg 15 of another link component, the link components 11 are slidable longitudinally along the surfaces 18 and 26. Sliding movement of the first leg 14 towards the second leg 15 stops when the end wall 22 of the free end 16 of the first leg 14 abuts the shoulder 28 in the free end 25 of the second leg 15, at which time the groove 21 is axially aligned with the groove 30, In a finished link 10, a retaining snap ring 32 (FIGS. 1, 2 and 5) is partially received in each of the grooves 21 and 30 so that the two link components 11 are locked against relative longitudinal movement towards a disassembled condition.

Figure 3:
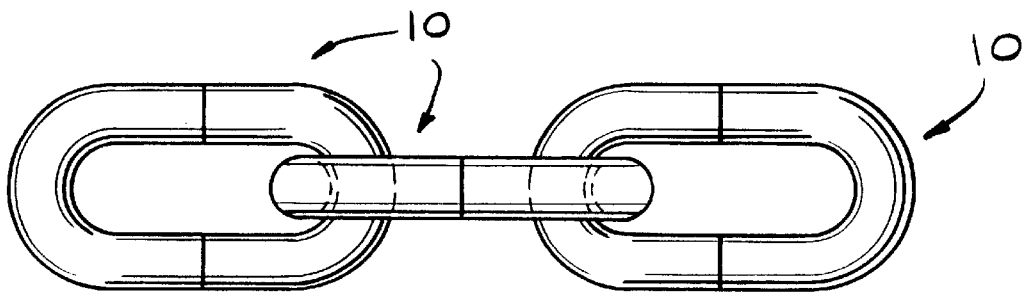
FIG. 3 is a plan view showing three of the assembled chain links of FIG. 1 interconnected to constitute a chain.

A method for producing a link 10 from first and second link components 11 will now he described, particularly with reference to FIGS. 4 and 5. A retaining snap ring 32 is contracted to reduce its diameter, the ring 32 is positioned in the groove 21 of the first leg 14 of the first link component 11, and the ring 32 is allowed to expand to a relaxed state where a portion of the ring 32 is carried in the groove 21. A second ring is similarly positioned in the groove 21 of the second link component 11. The two link components are then positioned so that the first leg 14 of the first link component 11 is axially aligned with the second leg 15 of the second link component 11 and so that the second leg 15 of the first link component 11 is axially aligned with the first leg 14 of the second link component 11. At this point, the free end 25 of the second leg 15 of the first link component 11 is inserted into the free end 16 of the first leg 14 of the second link component 11 at the same time as the free end 25 of the second leg of the second link component 11 is inserted into the free end 16 of the first leg of the first link component, as partially illustrated in FIG. 4. The first and second link components are further advance towards each other, so that the tapered portions of the free ends 25 of the second legs 15 of the link components 11 displace the snap rings 32 into the grooves 21 (not shown) and, further, until the end walls 22 of the free ends 16 of the first legs 14 of the link components 11 abut the shoulders 28 of the second legs 15, whereupon the grooves 21 align with the grooves 30 and portions of the snap ring connectors 32 enters the grooves 30, while portions of the snap ring connectors remain in the grooves 21. As a consequence, the rings 32 prevent longitudinal movement of the first and second link components 11 relative to one another in a finished link 10. The process is then repeated with a second pair of link elements 11, except that they are brought together with a portion of the finished link 10 captive between them so that, when they are assembled into a second finished link to, it is connected to the first finished link, as illustrated in FIG. 3.

Figure 6:
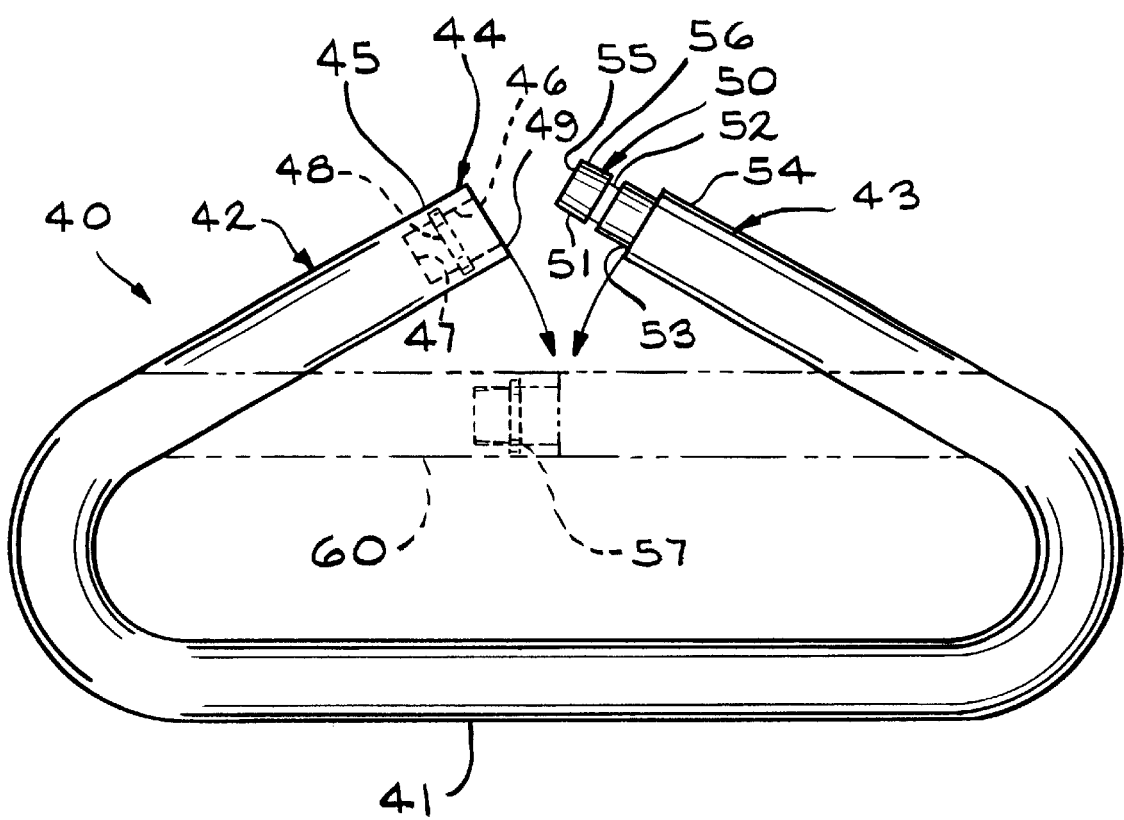
FIG. 6 is a plan view of a link blank according to the present invention and showing, partially in phantom lines, a finished link made from the blank.

Referring now to FIG. 6, a chain link blank according to the invention is indicated at 40 and comprises a link body 41 having a first leg 42 and a second leg 43. The first leg 42 is similar to the first leg 14 of the link component 11 and has a free end 44 with an outer surface 45 and an inner surface 46. There is an internal shoulder 47 adjacent to the inner surface 46 of the free end 44 of the first leg 42 of the chain link blank 40. A circumferential groove, indicated at 48 is formed in the inner surface 46 of the free end 44. At the end of the free end 44 of the first leg 42, there is a wall 49. The link blank 4 may be hollow so as to be lighter than it appears to be.

The second leg 43 is similar to the second leg 15 and has a free end 50 with an outer surface 51 and there is a groove, indicated at 52, in the outer surface 51. There is a shoulder 53 between the outer surface 51 and an outer surface 54 of the second leg, 43. Between the groove 52 and an end wall 55 of the free end 50 of the second leg 43, a portion 56 the free end 50 is tapered, so that it has a smaller outer diameter adjacent the end wall 55 than it has adjacent to the groove 52.

When the first leg 42 of the blank 40 is axially aligned with the second leg 43, the free ends 44 and 50 of the legs 42 and 43 are slidable longitudinally along the surfaces 46 and 51. Sliding movement of the first leg 42 towards the second leg, 43 stops when the end wall 49 of the free end 44 of the first leg 42 abuts the shoulder 53 in the free end 50 of the second leg 43, or when the end wall 55 of the free end 50 of the second leg 43 abuts the shoulder 47 adjacent to the inner surface 46 of the free end 44 of the first leg 42, or both. When the first and second legs 42 and 43 abut, the groove 48 on the inner surface 46 of the free end 44 aligns with the groove 52 so that a retaining snap ring 57 can be seated in them to prevent axial movement as between the first and second legs 42 and 43.

A method for producing a link 60, shown partially in phantom lines, from a chain link blank 40 will now be described with reference to FIG. 6. A retaining snap ring 57 is contracted to reduce its diameter, the ring 57 is positioned in the groove 48 of the first leg 42 of the link blank 40, and the ring is allowed to expand to a relaxed state where a portion of the ring 57 is carried in the groove 48. The blank 40 is then manipulated so that the first leg 42 is substantially axially aligned with the second leg 43 and the free end 50 of the second leg 43 is inserted into the free end 44 of the first leg 42. The blank 40 is further manipulated to advance the first and second legs 42 and 43 towards each other, so that the tapered portion 56 of the free end 50 of the second leg 43 displaces the snap ring 57 into the groove 48 (not shown) and, further, until the end wall 49 of the free end 44 of the first leg 42 abuts the shoulder 53 of the second leg 43, whereupon the groove 48 aligns with the groove 52 and a portion of the snap ring connector 57 enters the groove 52, while a portion of the snap ring 57 remains in the groove 48 (again, shown in phantom lines in FIG. 6), As a consequence, the ring 57 prevents longitudinal movement of the first and second legs 42 and 43 relative to one another in the finished link 60. The process is repeated with a second link blank 40 except that a portion of the finished link 60 is positioned within the finished link 60 so that, when the second blank is assembled into a second finished link 60, the links will be connected.

It will be appreciated that various changes and modification can be made from the specific details discussed above and shown in the attached drawings without departing from the spirit and scope of the invention as defined in the attached claims, and that, in its essential details, the invention is a chain link composed of at least two abutting link parts, one of which has an end which is slidably received within a correspondingly shaped end of the other link part, and a snap connector operable to lock the two link parts in their abutting positions. The snap connector is preferably a retaining snap ring received in grooves in the ends of the two link parts and the ring and the link parts are so shaped and positioned that, when the ring is received within the grooves, the link parts constitute a complete link of the desired configuration, and are securely locked to one another by the ring. The ends of the link parts that are slidable relative to one another are so configured that, before the two are assembled, the ring can be inserted in the groove of one of the correspondingly shaped link part ends and the other link part has a tapered surface which urges the ring radially outwardly when the two link parts are moved towards their assembled position. Once the link pails reach their final position, the snap retaining ring resumes its original shape and engages both grooves, thereby permanently locking the link parts together as a link. The link parts and the link blank can be made so that they produce links of various shapes and sizes. The link can be a twist link or any other desired shape. The link parts can be made of any suitable material including metal, plastic, glass and ceramic. As noted above, the link blank is made from a malleable or flexible material.

In a specific embodiment of the invention, each of the two link parts is a U-shaped member having parallel legs connected by a curved portion; when the two are connected together they form a chain link which is generally an oval in plan view. The parallel legs of one of the U-shaped members have regions of reduced thickness at their free ends, and the parallel legs of the other of the U-shaped members have regions of reduced outside diameter at their free ends. The regions of reduced outside diameter and the regions of reduced thickness are sized so that the former have a sliding fit inside the latter, When the two are assembled, they are locked against relative sliding movement by a ring which is received in cooperating slots in the U-shaped members.

In a second embodiment, the link structure is produced from a link blank having first and second free ends which extend towards each other. The first free end has a wall defining an opening for receiving an end portion of the second free end of the link blank. The free end portion of the second free end has a region of reduced outside diameter. The wall of the first free end and the end portion of the second free end are sized so that the latter has a sliding fit inside the former. The link is produced by positioning a locking ring in a circumferential groove provided on the inside of the wall of the first end or in a circumferential groove provided on the free end portion of the second free end, The link blank is then manipulated, if necessary, to axially align the free ends, and the free end portion of the second free end is pressed into the first free end until the ends are locked against relative sliding movement by the ring which is then received in the circumferential groove provided on the inside of the wall of the first end and the circumferential groove provided on the free end portion of the second free end.

Having described the invention, I claim:

1. A chain link composed of two abutting link parts, one of which has an end which is slidably received within a correspondingly shaped end of the other link part, and an interior ring received in cooperating grooves in, and locking the two link parts in their abutting positions, wherein the grooves, the ring, and the link parts are so shaped and positioned that, when the ring is received within the grooves, the link parts constitute a complete link of the desired configuration, and are securely locked to one another by the ring.

2. A chain link as claimed in claim 1 wherein the ends of the link parts that are slidable relative to one another are so configured that, before the two are assembled, the ring can be inserted in the groove of one of the correspondingly shaped link part ends and the other link part has a tapered surface which urges the ring radially outwardly when the two links are moved to their assembled position.

3. A chain link as claimed in claim 1 wherein each of the two link parts is a U-shaped member having parallel legs connected by a curved portion; and the two, when they are connected together, form a chain link which is generally an oval in plan view.

4. A chain link as claimed in claim 3 wherein the parallel legs of one of the U-shaped members have regions of reduced thickness at their free ends, and the parallel legs of the other of the U-shaped members have regions of reduced outside diameter at their free ends, and wherein the regions of reduced outside diameter and the regions of reduced thickness are so sized that the former have a sliding fit inside the latter.

5. A chain link as claimed in 1 wherein the link parts are connected to each other by a link body, at least a portion of which is malleable or flexible.

* * * * *